US008626592B2

(12) United States Patent
Simakov et al.

(10) Patent No.: US 8,626,592 B2
(45) Date of Patent: *Jan. 7, 2014

(54) REAL-TIME PAYMENT AUTHORIZATION

(71) Applicant: Google Inc., Mountain View, CA (US)

(72) Inventors: Pavel Simakov, San Mateo, CA (US);
Osama Bedier, San Jose, CA (US);
Angela Chun Wah Lai, Los Altos Hills, CA (US); Prasenjit Phukan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,924

(22) Filed: Mar. 18, 2013

(65) Prior Publication Data

US 2013/0290121 A1    Oct. 31, 2013

Related U.S. Application Data

(63) Continuation of application No. 13/475,112, filed on May 18, 2012, now Pat. No. 8,401,904.

(60) Provisional application No. 61/559,136, filed on Nov. 13, 2011.

(51) Int. Cl.
G06Q 20/00 (2012.01)
(52) U.S. Cl.
USPC .................................... 705/16; 705/26.1
(58) Field of Classification Search
None
See application file for complete search history.

(56) References Cited

U.S. PATENT DOCUMENTS

| 7,922,083 | B2 * | 4/2011 | Harrison et al. | 235/381 |
|---|---|---|---|---|
| 7,996,288 | B1 * | 8/2011 | Stolfo | 705/35 |
| 2005/0080716 | A1 * | 4/2005 | Belyi et al. | 705/38 |
| 2008/0183621 | A1 * | 7/2008 | Evans | 705/40 |
| 2009/0313143 | A1 * | 12/2009 | Darensbourg et al. | 705/28 |
| 2011/0180598 | A1 * | 7/2011 | Morgan et al. | 235/380 |
| 2011/0238510 | A1 * | 9/2011 | Rowen et al. | 705/16 |
| 2012/0109681 | A1 * | 5/2012 | Chapman et al. | 705/2 |
| 2012/0197794 | A1 * | 8/2012 | Grigg et al. | 705/41 |

* cited by examiner

*Primary Examiner* — F. Zeender
*Assistant Examiner* — Christopher Buchanan
(74) *Attorney, Agent, or Firm* — Johnson, Marcou & Isaacs, LLC

(57) ABSTRACT

Novel features to be used in a proxy card payment system include a real-time request to override a declined transaction or to select a different financial account and the insertion of user identification information into the transaction approval message sent to the merchant. A payment request is forwarded to the payment system, which maintains the proxy card account and determines whether the transaction violates a user-defined rule. If the transaction is declined by the issuer that maintains the financial account, or the payment system for violation of a user-defined rule, the payment system sends a real-time message to the user. The user is prompted to override the rule causing the transaction to be declined or to select a new account to process the transaction. Once the payment system receives authorization for the transaction, it inserts the user identification information in an approval message before transmitting the approval to the merchant.

26 Claims, 10 Drawing Sheets

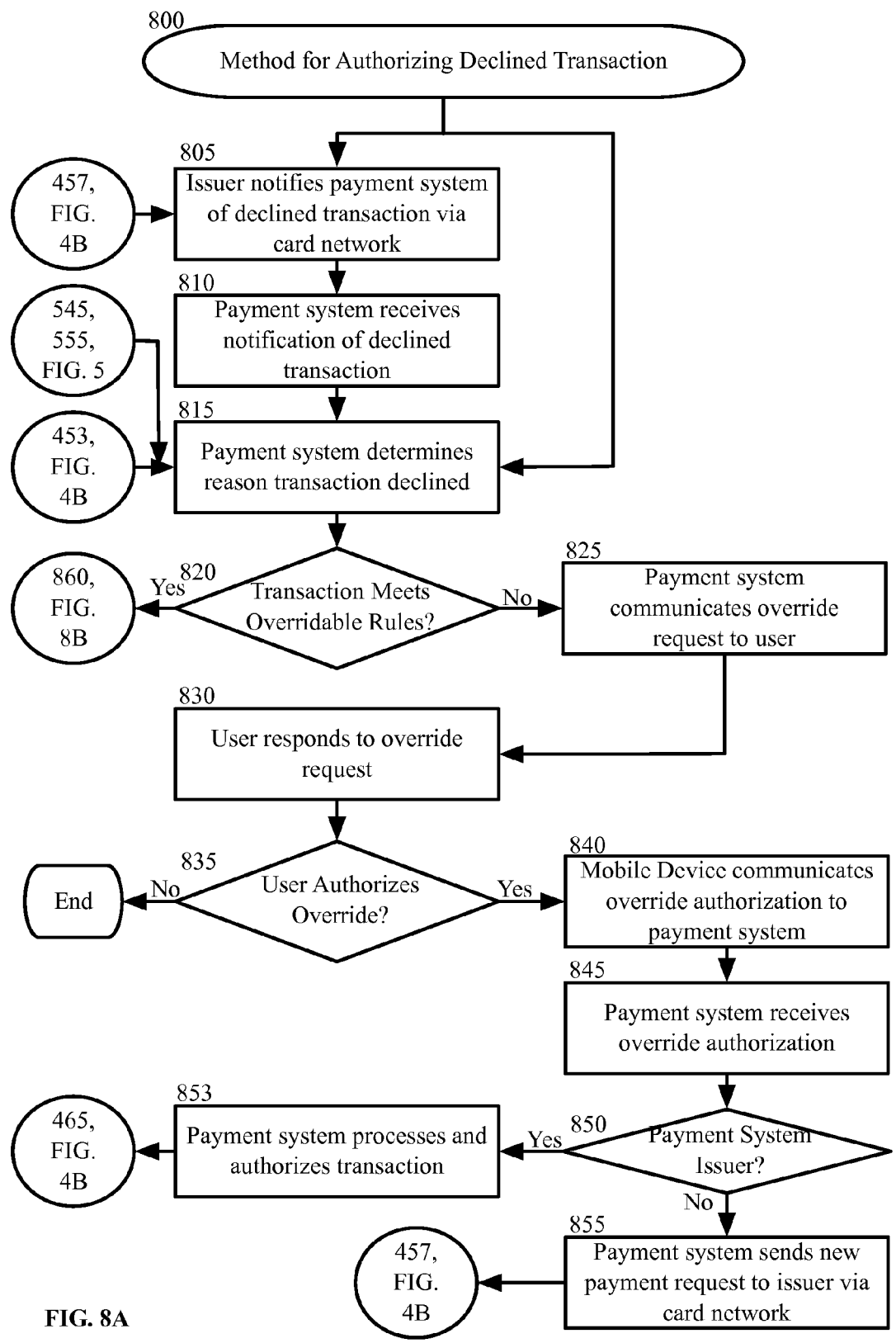

REAL-TIME PAYMENT AUTHORIZATION

RELATED APPLICATIONS

This application is a continuation of U.S. patent application Ser. No. 13/475,112 filed May 18, 2012 and entitled "Real-time Payment Authorization," which claims priority to U.S. Provisional Patent Application No. 61/559,136 filed Nov. 13, 2011 and entitled "Virtual Payment Path." The entire contents of the above-identified priority applications are hereby fully incorporated herein by reference.

TECHNICAL FIELD

The present disclosure relates generally to proxy cards, and, more particularly, to novel features to be used in proxy card payment systems.

BACKGROUND

In a conventional merchant-consumer financial transaction, the merchant's point of sale terminal or online payment process engine submits a payment request to the acquirer (for example Chase PaymentTech, or other third party payment processing companies) for payment for the transaction. The acquirer then submits the request to authorize the transaction to the issuer (for example Citibank, CapitalOne, Bank of America, and other financial institutions to authorize payment) through the card network (for example VISA, MasterCard, American Express, Discover or other card processing networks). If funds are available, the issuer sends an authorization code to the acquirer through the card network, and the acquirer notifies the merchant of the approval for the payment transaction. The payment process involves a single payment request generated and submitted by the merchant. The request contains generalized information, such as the total payment amount and consumer account-identifying information encoded on the card's magnetic stripe, but the request does not contain item-specific information, such as the stock-keeping unit ("SKU") number, or user identification information, such as an electronic mail address.

Conventional merchant-consumer financial transactions also have involved payment via a consumer's financial account, such as a debit card, credit card, or stored value card. The consumer card typically accesses only one type of account, which is maintained by only one issuer. For instance, an "issuer1" credit card accesses only the consumer's financial account from "issuer1," and payment is approved/denied by a single issuer ("issuer1"). Approval or denial of the transaction is dependent upon rules set by the particular issuer, for example, credit limits and geographical limitations. Notification of a violation of these rules results in a declined transaction, and the consumer must contact the issuer to alter the rules or to address a declined transaction.

More recently, proxy card payment systems enable users to utilize a single card to access multiple financial accounts maintained by multiple issuers. The user receives a proxy card from the payment system and either creates a new payment system account or associates the proxy card with the user's digital wallet account already maintained by the payment system. The user then associates one or more financial card accounts with the proxy account. For example, the user can associate with the user's proxy card account multiple debit/credit cards maintained by multiple issuers (including the payment system operating as an issuer), stored value cards (for example, gift cards, prepaid cards, re-loadable transaction cards, exchange cards, and other forms of non-credit based value cards), loyalty cards or store rewards cards, value added service accounts (for example, coupons, vouchers for prepaid offers, redemption offers, and other forms of offers), and/or other forms of financial card accounts. The user applies the proxy card to a transaction with the merchant in a manner similar to the application of any financial card to a transaction. The merchant forwards the payment request to the acquirer, which forwards the payment request to the card network. The card network forwards the proxy card payment request to the payment system, which functions as the issuer for the payment request. The payment system can read proxy card account information from the payment request and can access the user's account associated with the proxy card. If the payment system is the issuer of the financial account, the payment system will approve or decline the transaction. If another issuer maintains the financial account, the payment system will generate and send a new payment request to the issuer via the card network. The payment system will receive the authorization message from the issuer via the card network if the transaction is approved. The payment system forwards an authorization to the acquirer through the card network, which forwards the authorization to the merchant. The merchant then approves the transaction.

SUMMARY

In certain exemplary aspects, novel features to be used in a proxy card payment system include a real-time request to override a declined transaction or a real-time request to select a different financial account to proceed with the transaction and the insertion of user identification information into the transaction approval message sent to the merchant. A payment system includes specified information for multiple financial accounts, including, but not limited to debit cards, credit cards, stored value cards, loyalty/rewards cards, and coupons (including purchased offers and other offers), each accessible by the proxy account. The user sets rules specifying which financial account will be accessed when the proxy card is used and specifying limits or circumstances during which the proxy card will be declined. A payment request is forwarded to the payment system, which maintains the proxy card account. The payment system reads the user account information before using the rules to determine the order in which the financial accounts are to be applied and whether the transaction violates a user-defined rule. If the payment system does not maintain the financial account, the payment system sends a new payment request to the issuer of the referenced account. If the transaction is to be declined by the issuer or the payment system, the payment system can send a real-time message to the user via the user's mobile device. The user may be prompted to override a rule causing the transaction to be declined or to select a new account to process the transaction. Once the payment system receives authorization for the transaction, it can insert user identification information in an approval message before transmitting the approval to the merchant, through the card network and acquirer. User identification information also can be provided in the proxy card account information stored on the magnetic stripe of the proxy card or otherwise associated with the proxy card account identifier.

These and other aspects, objects, features and advantages of the exemplary embodiments will become apparent to those having ordinary skill in the art upon consideration of the following detailed description of illustrated exemplary embodiments, which include the best mode of carrying out the invention as presently presented.

BRIEF DESCRIPTION OF THE DRAWINGS

FIG. 4, comprising

FIG. 8, comprising FIGS. 8A and 8B, is a block flow diagram depicting a method for authorizing a declined transaction according to an exemplary embodiment.

DETAILED DESCRIPTION OF EXEMPLARY EMBODIMENTS

Overview

Figure 1:
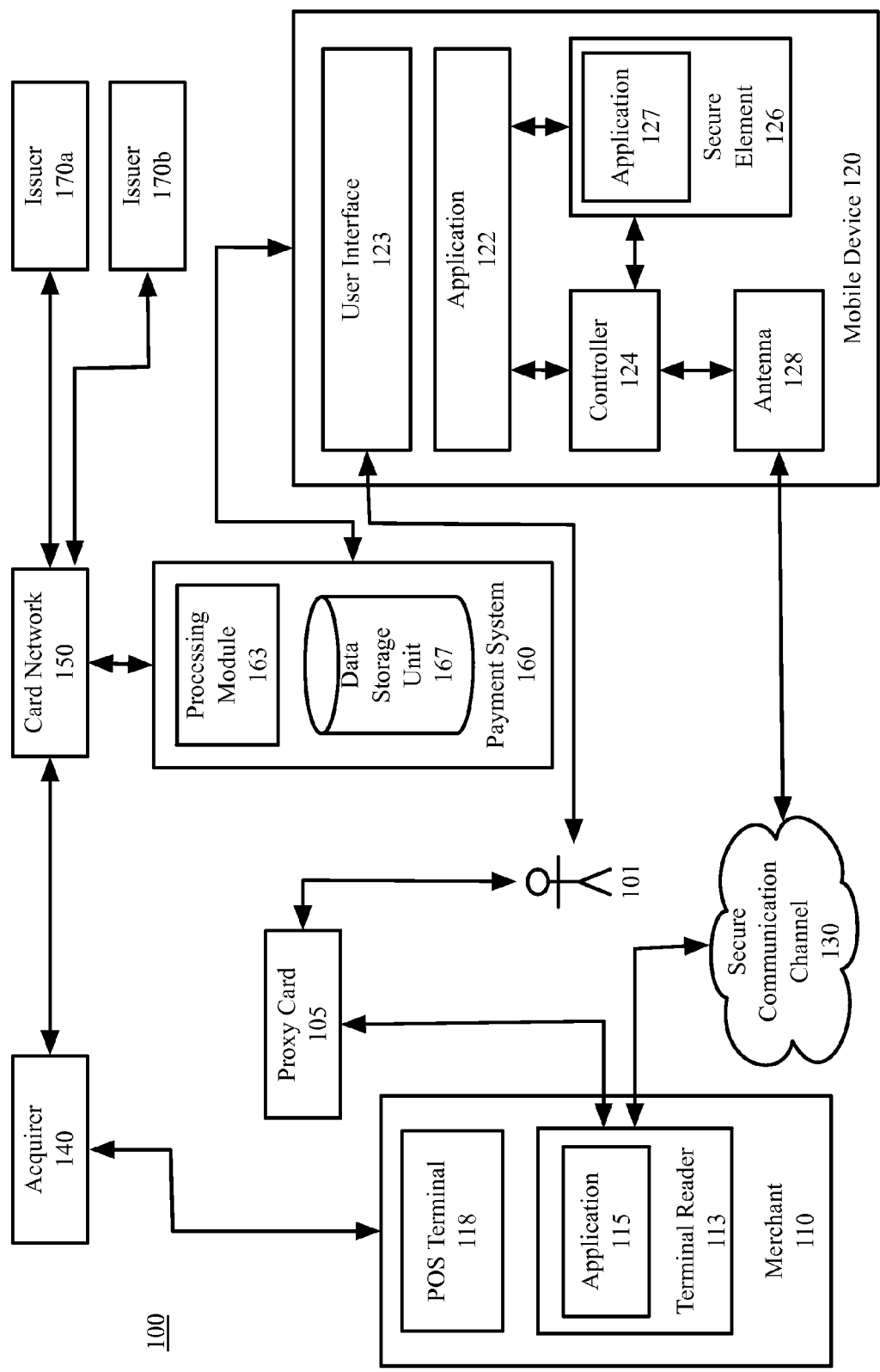
FIG. 1 is a block diagram depicting an operating environment for a single proxy account capable of accessing multiple accounts maintained by multiple issuers according to an exemplary embodiment.

A payment system includes specified information for multiple financial accounts, including, but not limited to debit cards, credit cards, stored value cards, loyalty/rewards cards, and coupons (including purchased offers and other offers), each accessible by the proxy account. The user sets rules specifying which financial account will be accessed when the proxy card is used and specifying limits or circumstances during which the proxy card will be declined. The user can then add, delete, or change the default payment rules associated with the proxy card. The user can change these default static rules, create new rules, or delete a rule. In an exemplary embodiment, the user can access the payment system account and modify the rules at any time, including a time immediately before a payment transaction is initiated using the proxy card. In an exemplary embodiment, the user can access the payment system account using a mobile device application.

If the user has defined static payment rules or added/deleted/modified the rules prior to the transaction, the payment system applies the user-defined rules to the transaction first. Otherwise, the payment system applies the default static payment rules to the transaction. If the transaction is to be declined, the payment system notifies the user of the declined transaction via a message communicated to the user's mobile device. If the violation of a rule caused the transaction to be declined, the user may be prompted to override the rule. If the financial account has insufficient funds, the user may be prompted to select a new financial account. Instead of declining the payment request, the payment system can authorize and/or process the payment request based on the user's response to the message. Alternatively, the payment system can decline the original payment request, communicate the notice message to the user, receive the user's response, and revise the stored rules for payment. Then, the user may immediately initiate a new payment transaction with the merchant using the proxy card. The payment system will then approve the payment transaction after receipt of a new payment request.

The payment system generates a new payment request if the financial account is maintained by a non-payment system issuer or authorizes the original payment request if the payment system maintains the financial account. In either case, the payment system can add user identification information to the authorization message received from the issuer or generated by the payment system acting as issuer for the financial account. The payment system also can forward offers to the user or inject offers directly into the payment transaction based on the product identification information received in the payment message and/or the merchant identification information.

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements or other information, without risking disclosure of personal information or the user's identity.

The functionality of the exemplary embodiments will be explained in more detail in the following description, read in conjunction with the figures illustrating the program flow.

System Architecture

Turning now to the drawings, in which like numerals indicate like (but not necessarily identical) elements throughout the figures and exemplary embodiments are described in detail.

FIG. 1 is a block diagram depicting an operating environment 100 for a proxy card 105 capable of accessing multiple accounts maintained by multiple issuers 160, 170 according to an exemplary embodiment. As depicted in FIG. 1, the exemplary operating environment 100 includes a proxy card 105, merchant system 110, a user 101 mobile device system 120, an acquirer system 140, a card network system 150, an issuer/payment system 160, and one or more issuer system 170 that are configured to communicate with one another via one or more communication networks (not shown).

Each communication network includes a wired or wireless telecommunication means by which network devices (including devices 105, 110, 120, 140, 150, 160 and 170) can exchange data. For example, each network can include a local area network ("LAN"), a wide area network ("WAN"), an intranet, an Internet, a mobile telephone network, a card network or any combination thereof. Throughout this specification, it should be understood that the terms "data" and "information" are used interchangeably herein to refer to text, images, audio, video, or any other form of information that can exist in a computer-based environment.

The secure communication channel 130 includes a telecommunication means by which network devices (including devices 110 and 120) can exchange data. For example, each connection can include a local area network (LAN), a wide area network (WAN), an intranet, an Internet, a mobile telephone network, a personal area network (PAN) or any combination thereof. In exemplary embodiments, the secure communication channel 130 comprises a proximity communication connection, such as Bluetooth. Bluetooth can enable the exchange of data over short distances through the creation of PANs with high levels of security. Wi-Fi is yet another proximity communication type wherein contactless devices can communicate via a wireless ad hoc network. In an alternative exemplary embodiment, the secure communication channel 130 comprises a near field communication (NFC) communication method.

The point of sale (POS) terminal system 110 includes a terminal reader 113 that is capable of reading the proxy card 105 and communicating with the mobile device system 120 and the merchant POS terminal 118 via an application 115.

In an exemplary embodiment, the terminal reader 113 comprises a magnetic stripe reader, which reads a magnetic stripe on the proxy card 105 when the proxy card 105 is swiped in the reader. In other exemplary embodiments, the terminal reader 113 comprises a bar code, QR code, or other machine-readable scanner that captures information from the proxy card.

In another exemplary embodiment, the terminal reader 113 comprises a communication component that communicates with the mobile device 120 using a Bluetooth communication method. In an alternative exemplary embodiment, the terminal reader 113 communicates with the mobile device 120 using a Wi-Fi communication method. In yet another exemplary embodiment, the terminal reader 113 communicates with the mobile device 120 using a NFC communication method. While the terminal reader 113 is depicted as standalone hardware device, the terminal reader 113 also may be an integrated part of the POS terminal 118, in accordance with alternative exemplary embodiments.

In an exemplary embodiment, the mobile device system 120 can refer to a smart device that can communicate via an electronic, magnetic, or radio frequency field between the device and another device, such as a terminal reader 113. In an exemplary embodiment, the mobile device 120 has processing capabilities, such as storage capacity/memory and one or more application 122 that can perform a particular function. In an exemplary embodiment, the mobile device 120 contains an operating system (not illustrated) and user interface 123. Exemplary mobile devices 120 include smart phones; mobile phones; PDAs; mobile computing devices, such as netbooks and iPads; other electronically enabled key fobs; electronically enabled credit card type cards; and other devices, in each case having processing and user interface functionality. Certain mobile devices 120 can be used for multiple purposes, including financial transactions, coupons, ticketing, secure authentication, and other related applications.

The secure element 126 can exist within a removable smart chip or a secure digital (SD) card, or can be embedded within a fixed chip on the mobile device 120. In certain exemplary embodiments, Subscribed Identity Module (SIM) cards may be capable of hosting a secure element 126, for example, an NFC SIM Card. The secure element allows a wallet software application or other application (122 or 127) resident on the device 120 and accessible by the user 101 to interact securely with certain functions within the secure element 126, while protecting information stored within the secure element. The secure element 126 comprises applications 127 running thereon that perform the functionality described herein.

The secure element 126 includes components typical of a smart card such as crypto processors and random generators. In an exemplary embodiment, the secure element 126 comprises a Smart MX type NFC controller 124 in a highly secure system on a chip controlled by a smart card operating system, such as a JavaCard Open Platform (JCOP) operating system.

In another exemplary embodiment, the secure element 126 is configured to include a non-EMV type contactless smart card, such as an optional implementation.

The secure element 126 communicates with the controller 124 and the application 122 in the mobile device 120. In an exemplary embodiment, the secure element 126 is capable of storing encrypted user information and only allowing trusted applications to access the stored information. The controller 124 interacts with a secure key encrypted application 122 for decryption and installation in the secure element 126. In an exemplary embodiment, the controller 124 is a Bluetooth link controller. The Bluetooth link controller may be capable of sending and receiving data, identifying the terminal reader 113, performing authentication and ciphering functions, and directing how the mobile device 120 will listen for transmissions from the terminal reader 115 or configure the mobile device 120 into various power-save modes according to the Bluetooth-specified procedures. In another exemplary embodiment, the controller 124 is a Wi-Fi controller or an NFC controller capable of performing similar functions.

The application 122 is a program, function, routine, applet or similar entity that exists on and performs its operations on a mobile device 120. For example, the application 122 may be one or more of a digital wallet application, a coupon application, a loyalty card application, another value-added application, a user interface application, or other suitable application operating on the mobile device 120. Additionally, the secure element 126 also may comprise secure contactless software applications, such as payment applications, secure forms of the applications 122, authentication applications, payment provisioning applications, or other suitable application using the secure functionality of the secure element.

An exemplary digital wallet application 122 enables storage of one or more financial card accounts registered by user 101. In an exemplary embodiment, the registered accounts can be maintained by the user's 101 digital wallet application 122 and stored in the data storage unit 167. In yet another embodiment, the registered accounts can be maintained by the payment system's 160 processing module 163 and stored in the data storage unit 167.

The mobile device 120 communicates with the terminal reader 113 via an antenna 128. In an exemplary embodiment, once the mobile device application 122 has been activated and prioritized, the controller 124 is notified of the state of readiness of the mobile device 120 for a transaction. The controller 124 outputs through the antenna 128 a radio signal, or listens for radio signals from the device reader 115. On establishing a secure communication channel 130 between the mobile device 120 and the terminal reader 113, the terminal reader 113 requests the list of available applications 127 from the secure element 126. A directory is first displayed, after which, based on the set priority or the type of device reader 115, an application 127 is chosen and initiated for the transaction.

In certain exemplary embodiments, the network devices (including devices 110, 120, 140, 150, 160, and 170) include an HTML5 compliant or other web server. HTML5 compliant web servers include a cross-document messaging application programming interface ("API") and a local storage API that previous HTML versions did not have. The cross-document messaging API of HTML5 compliant web servers enable documents, such as websites, to communicate with each other. For example, a first document can send a message to a second document requesting information. In response, the second document can send a message including the requested information to the first document. The local storage API of HTML5 compliant web browsers enables the web browser to store information on a client device upon which the web browser is installed or is executing. Websites can employ the local storage API to store information on a client device. Other web browsers have cross-document messaging and/or local storage capabilities also may be used in certain exemplary embodiments.

In an exemplary embodiment, the proxy card 105 looks and/or functions in the same manner as a standard credit or debit card. For example, the proxy card 105 may have the user's 101 name and/or account number listed on the front of the card 105. An exemplary proxy card 105 can include a magnetic stripe encoding the user's 101 payment system 160 account information. In an exemplary embodiment, the account information encoded in the magnetic stripe routes payment requests to the payment system 160 for processing.

In an alternative exemplary embodiment, the proxy card 105 is not a physical card. Instead, the proxy card 105 is an account accessible by a wireless tap of a mobile device 120, an account identification number, a bar code or QR code, a token, or other form of account identification or access, which may be entered manually into the term POS terminal 118 or terminal reader 113 or which may be captured by the terminal reader 113. The proxy card 105 as discussed throughout the specification refers to a physical card as well as the proxy account.

The user 101 may use the mobile device 120 or other network device to register the proxy card 105 and/or access the user's 101 payment system 160 account. The mobile device 120 may comprise appropriate technology that includes or is coupled to a web server (for example, Google Chrome, Microsoft Internet Explorer, Netscape, Safari, Firefox, or other suitable application for interacting with web page files).

The payment system 160 includes a data storage unit 167 accessible by the processing module 163. The exemplary data storage unit 167 can include one or more tangible computer-readable storage devices.

The user 101 can use the web server to view, register, download, upload, or otherwise access the payment system 160 via a website (not illustrated) and a communication network (not illustrated). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with the proxy card 105. The registered financial card accounts may have multiple issuers 160, 170 that maintain each financial account. The payment system 160 also may function as the issuer for the associated financial account. The user's 101 registration information is saved in the payment system's 160 data storage unit 167 and is accessible the by the processing module 163. The registration of a user 101 proxy card 105 is discussed in more detail hereinafter with reference to the methods described in FIG. 2.

The user 101 also may use the web server to define proxy card 105 payment rules. The creation of proxy card 105 payment rules is discussed in more detail hereinafter with reference to the methods described in FIG. 3.

The merchant 110 may use a web server (not illustrated) to view, download, upload, create offers, or otherwise access the payment system 160 via a website (not illustrated) and a communication network (not illustrated).

The user 101 may request a purchase from the merchant 110. In an exemplary embodiment, the purchase is initiated by swiping the proxy card 105 at the POS terminal 118. In an alternative exemplary embodiment, the purchase is initiated by a wireless "tap" of the mobile device 120 with the terminal reader 113. In an alternative exemplary embodiment, the purchase is initiated when the user 101 enters an account identification number at the POS terminal 118 or in the mobile device 120. The account identification number may be the proxy card 105 account number or a different number that links the payment transaction to the proxy card 105 account. In yet another alternative exemplary embodiment, the purchase is initiated by use of a permanent/temporary virtual/physical token, QR code, bar code, or other suitable machine-readable medium captured by the terminal reader 113. The merchant's POS terminal 118 interacts with the acquirer 140 (for example Chase PaymentTech, or other third party payment processing companies), the card network 150 (for example VISA, MasterCard, American Express, Discover or other card processing networks), the payment system 160, and the issuer 170 (for example Citibank, CapitalOne, Bank of America, and other financial institutions to authorize payment). The processing of proxy card 105 payments is discussed in more detail hereinafter with reference to the methods described in FIGS. 4-8.

System Process

Figure 2:
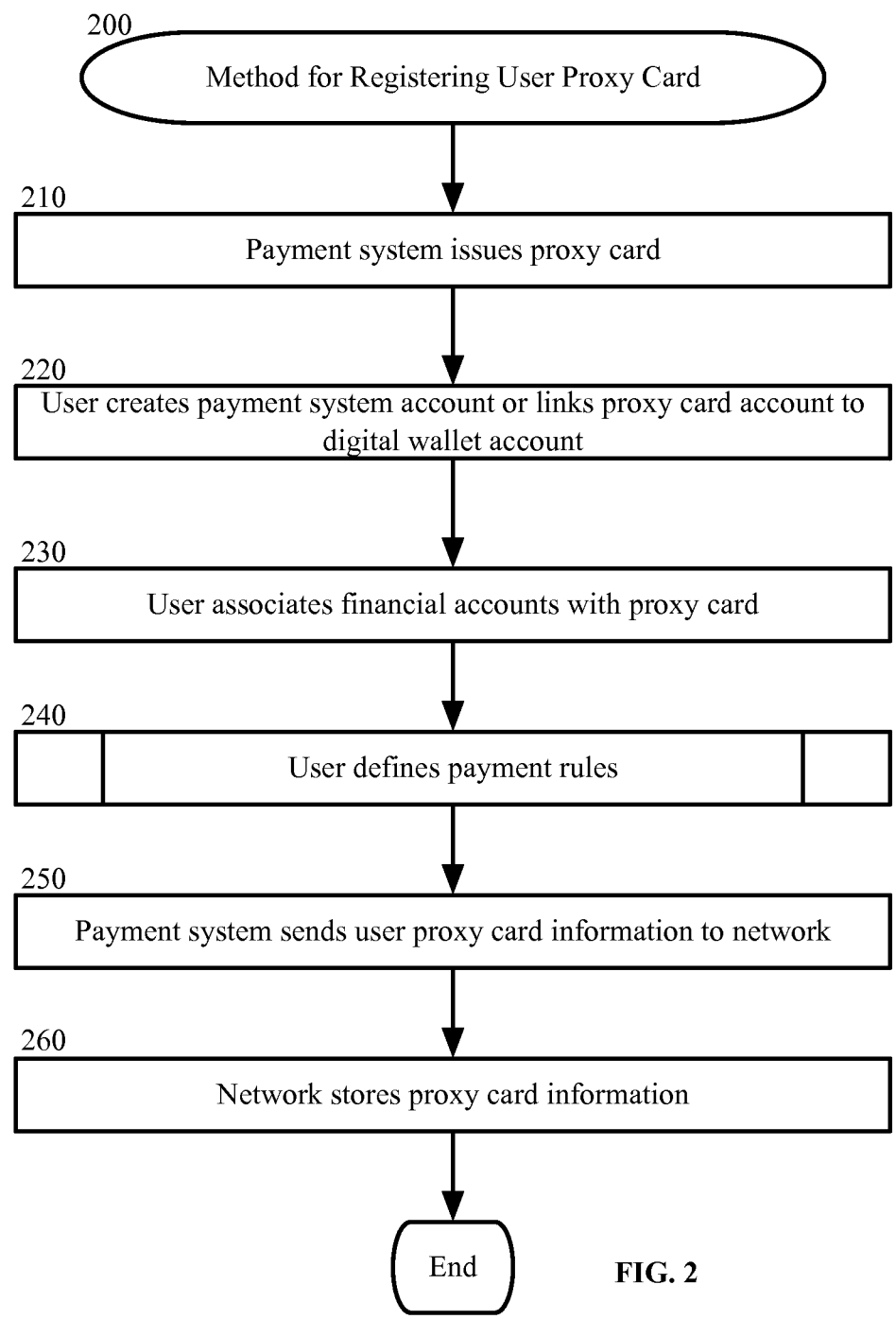
FIG. 2 is a block flow diagram depicting a method for registering a user proxy card according to an exemplary embodiment.

FIG. 2 is a block flow diagram depicting a method for registering a user proxy card according to an exemplary embodiment. The method 200 is described with reference to the components illustrated in FIG. 1.

In block 210, the payment system 160 issues a proxy card 105 to the user 101. In an exemplary embodiment, the user 101 creates requests a proxy card 105 using a web server, and the proxy card 105 is mailed to the user 101. The user 101 may be issued an account number to be used for transactions via the Internet before a physical card is received. In an alternative exemplary embodiment, the payment system 160 mails an inactivated proxy card 105 to the user 101. The proxy card 105 is then activated by the user 101 before use. In an alternative exemplary embodiment, a physical proxy card 105 is not issued. The proxy card 105 account information is stored in the mobile device 120 and is used to make a payment via a NFC, Bluetooth, Wi-Fi, or other form of wireless tap of the mobile device 120 with the terminal reader 113. In an alternative exemplary embodiment, the purchase is initiated when the user 101 enters an account identification number at the POS terminal 118 or in the mobile device 120. The account identification number may be the proxy card 105 account number or a different number that links the payment transaction to the proxy card 105 account. In yet another alternative exemplary embodiment, the purchase is initiated by use of a permanent/temporary virtual/physical token QR code, bar code, or other suitable machine-readable medium that is read by the POS terminal 118. In these cases, the POS terminal 118 may comprise a scanner, camera, or other reading device that captures the proxy account information, such as a bar code or QR reader or other suitable reading device. The proxy account information may be printed in paper or other form.

In block 220, the user 101 creates a new payment system 160 account or links the proxy card 105 to an existing payment system 160 account. The payment system 160 also may create or update a digital wallet application 122 account on the mobile device 120.

In block 230, the user 101 activates the proxy card 105 and associates one or more financial card accounts (for example, debit cards, credit cards, gift cards/stored value cards, loyalty cards/reward cards, coupons, prepaid or other offers, and other accounts used to make a purchase or redeem value added services) with the proxy card 105 account. In an exemplary embodiment, the user associates multiple financial card accounts with the proxy card 105 account. The user 101 may perform this block by inputting identifying information for each financial card account.

In an exemplary embodiment, one or more financial card account(s) are maintained by the payment system 160 and other issuers 170a. In an alternative exemplary embodiment, the payment system 160 maintains one or more of the financial card accounts and acts as the issuer for that financial card account. In another exemplary embodiment, the financial card accounts are maintained by more than one issuer 170, including the payment system 160.

The user 101 may define payment rules to be followed when processing a payment using the proxy card 105, in block 240. The method for defining the proxy card 105 rules is described in more detail hereinafter with reference to the methods described in FIG. 3.

Figure 3:
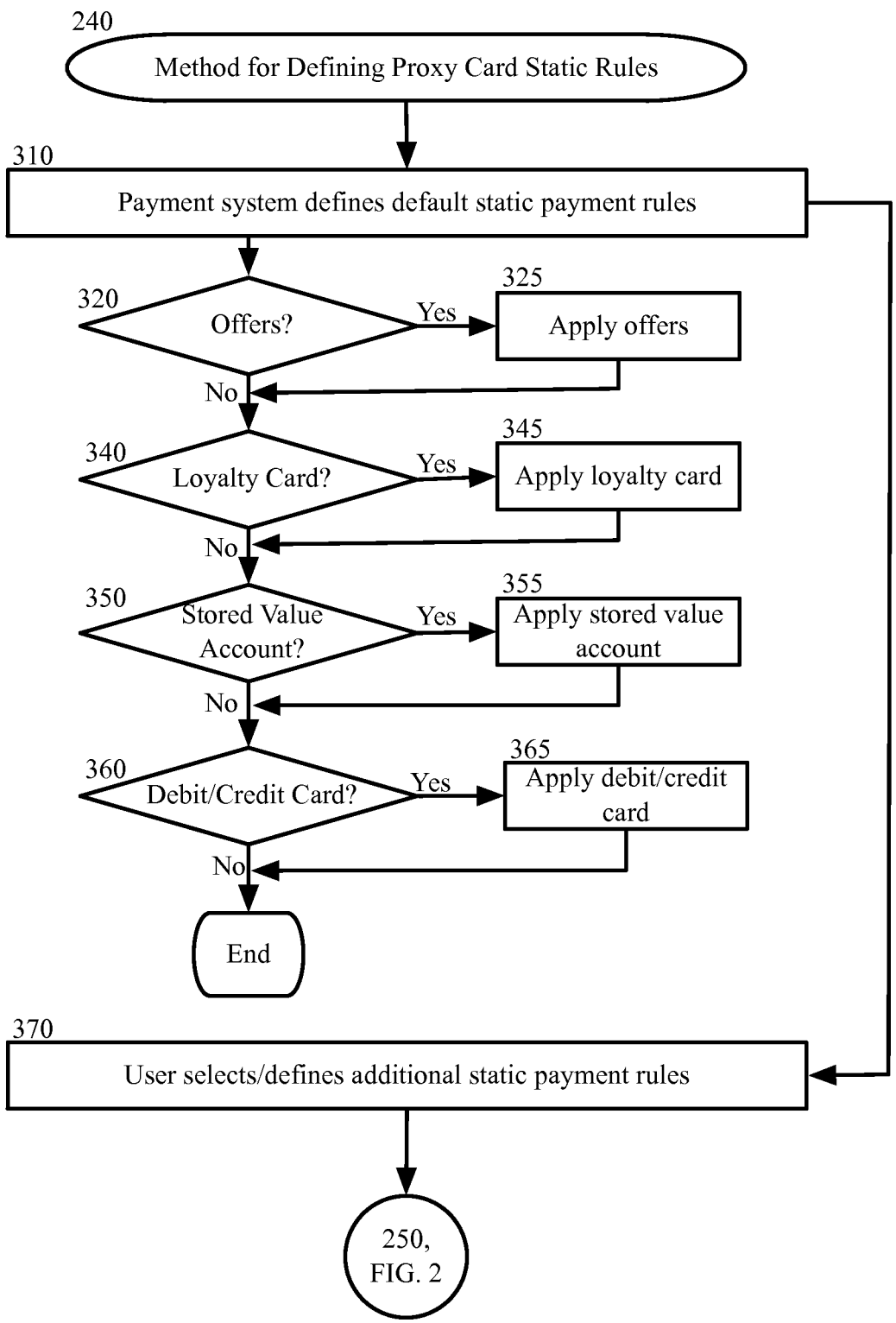
FIG. 3 is a block flow diagram depicting a method for defining proxy card static rules according to an exemplary embodiment.

FIG. 3 is a block flow diagram depicting a method for defining proxy card static rules according to an exemplary embodiment. The method 240 is described with reference to the components illustrated in FIG. 1.

In block 310, the payment system 160 sets forth the default payment rules associated with the proxy card 105 account. Blocks 320 through 365 describe the exemplary default payment rules. In an alternative exemplary embodiment, the exemplary default rules may appear in any order. In another exemplary embodiment, one or more of the exemplary default rules may not be used if additional funds are not required. For example, if after the application of a stored value account, further funds are not required to complete the purchase, the payment transaction will be fully authorized without following further rules.

Blocks 320-365 depict an exemplary rule flow. In an exemplary embodiment, offers and value added services are applied first. In block 320, the payment system 160 will determine if the user 101 has any coupons, vouchers, prepaid or other redemption offers, or other forms of value added services associated with the proxy card 105 first.

If the payment system 160 determines that the user 101 has a value added service available, it will apply those financial accounts first, in block 325. In an exemplary embodiment, the payment system 160 will have a pre-defined order in which it looks for and applies the various forms of value added services. For example, the payment system 160 may apply vouchers first, then coupons, then redemption offers, and finally any other form of registered value added service.

If the payment system 160 determines that the user 101 does not have a value added service available, it will proceed to block 340.

In an exemplary embodiment, loyalty cards are applied second. In block 340, the payment system 160 will determine if the user 101 has a loyalty card, reward card, or other form of store value card associated with the proxy card 105. In an alternative exemplary embodiment, the payment system 105 may apply loyalty cards before other forms of value added services.

If the payment system 160 determines that the user 101 has a loyalty card available, it will apply that financial account. In an exemplary embodiment, the payment system 160 will determine if multiple loyalty cards are available and apply each financial account.

If the payment system 160 determines that the user 101 does not have a loyalty card available, it will proceed to block 350.

In an exemplary embodiment, stored value accounts are applied third. In block 350, the payment system 160 will determine if the user 101 has a stored value account, including gift cards, prepaid cards, re-loadable transaction cards, exchange cards and other forms of non-credit based value cards associated with the proxy card 105.

If the payment system 160 determines that the user 101 has a stored value card available, it will apply that financial account. In an exemplary embodiment, the payment system 160 will determine if multiple stored value accounts are available and apply each financial account.

If the payment system 160 determines that the user 101 does not have a stored value card available, it will proceed to block 360.

In an exemplary embodiment, debit and credit cards are applied last. In block 360, the payment system 160 will determine if the user 101 has a debit card, credit card or other form of credit-based account associated with the proxy card 105.

If the payment system 160 determines that the user 101 has a debit/credit card available, it will apply that financial account.

If the payment system 160 determines that the user 101 does not have a debit/credit card available, the transaction will end.

In an exemplary embodiment, the default static payment rules may be presented in any order. In an alternative exemplary embodiment, the payment system 160 may add, delete, or otherwise change any of the default static payment rules.

The user 101 also may configure payment rules. In block 370, the user 101 may add, delete, or otherwise change any of the default static payment rules. In an exemplary embodiment, the user 101 also may change the order of the rules.

In an exemplary embodiment, the user 101 may define or select additional static payment rules. The user 101 may define payment rules based on the type of or name of the merchant (for example, if the merchant is a restaurant, use the A credit cards first, or use the frequent flyer credit card if the merchant is an airline), the time of day or day of the week (for example, use the restaurant loyalty card first for lunches over $5, or use the business credit card for weekday expenses between the hours of 9 am and 5 pm), or the location or currency used by the merchant (for example, use credit card X for all European transactions, or use credit card Z for all online transactions). The user may define conditional rules. For example, if the transaction is under $5 at B coffee shop, use the Y gift card.

In addition to the rules discussed with reference to FIG. 3, the payment system 160 also can learn rules for application of a financial account. For example, if the user applies a particular financial account to a particular merchant or type of merchant, and the user repeats that process for a predetermined number of times or time period, then the payment system 160 can create a rule to apply that particular financial account whenever the proxy card is used at the particular merchant or type of merchant. The payment system 160 can log the user's 101 past use of particular financial accounts with regard to particular merchants or types of merchants. Then, when such logging determines that the user consistently applies the same financial account with the same merchant or type of merchant, the payment system 160 establishes a new rule for such use. In an exemplary embodiment, the payment system 160 can identify the user's past application of a particular financial account based on the user's rule setting in the payment system 160 within a predetermined time of application of the user's proxy card at the particular merchant or type of merchant. The payment system 160 may insert the learned rules into the appropriate order of payment rules. For example, if the learned payment rule applies to a credit or debit card, then the learned payment rule is inserted prior to the standard rule for applying credit or debit cards. A similar insertion process applies to offers, loyalty cards, and stored value cards.

In an exemplary embodiment, the user 101 can access the payment system 160 account via the mobile device 120 and can add, delete, or modify the static rules at any time. In an exemplary embodiment, the user 101 can access the payment system 160 account and override the static rules on a one-time or multiple-time basis, without permanently changing the static rules. In an alternative exemplary embodiment, the user 101 can use a mobile device 120 application 122 to add, delete, or modify the static rules using the user interface 123 at the time payment is made.

From block 370, the method 240 proceeds to block 250 (FIG. 2).

Returning to FIG. 2, in block 250, the payment system 160 sends the user proxy card 105 account identification information to the network 150.

In block 260, the network 150 stores the proxy card account identification information. In an alternative exemplary embodiment, the account number identifies the payment system 160 as the issuer and payments are automatically routed from the network 150 to the payment system 160 for approval.

Figure 4A:
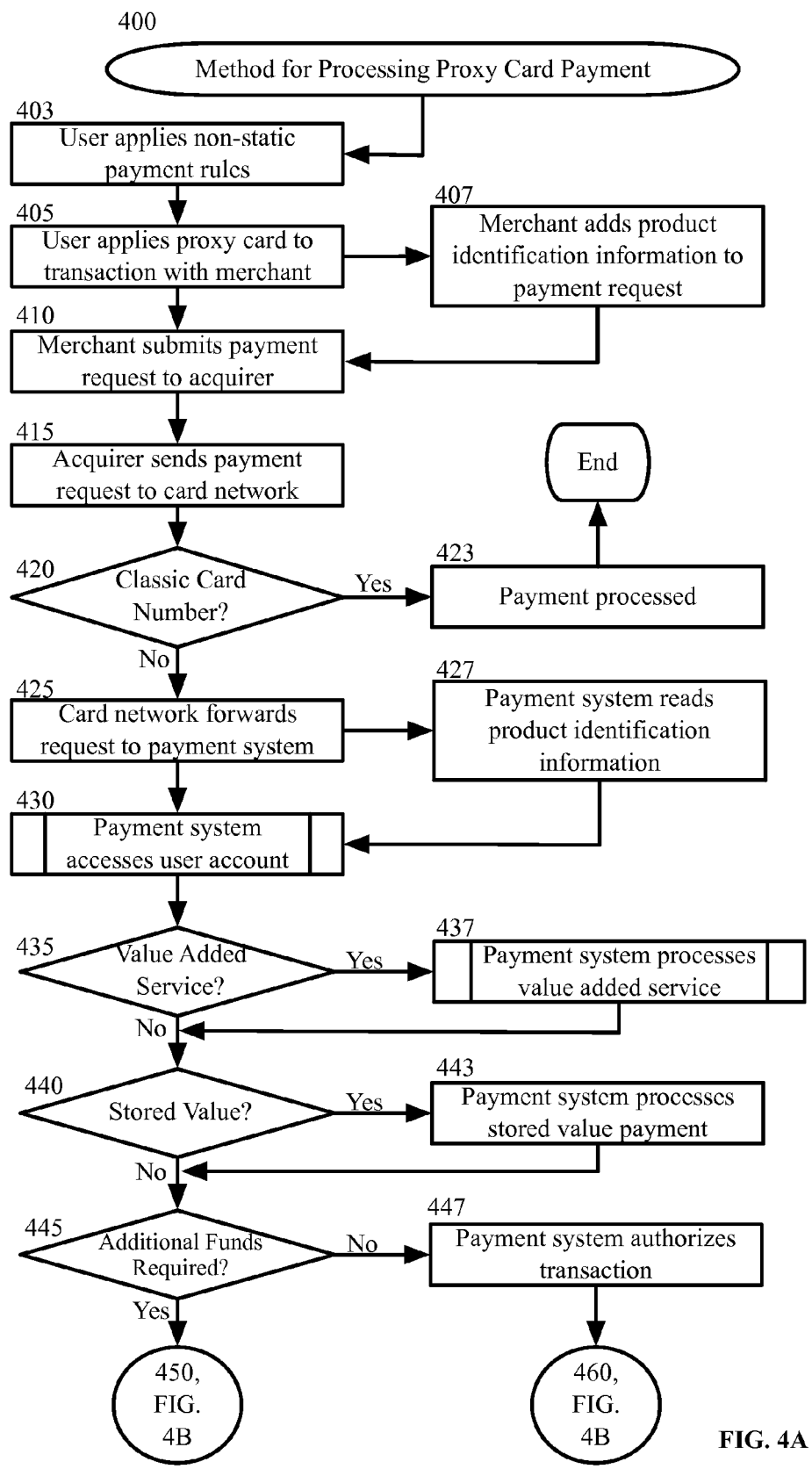
FIGS. 4A and 4B, is a block flow diagram depicting a method for processing a proxy card payment according to an exemplary embodiment.
Figure 4B:
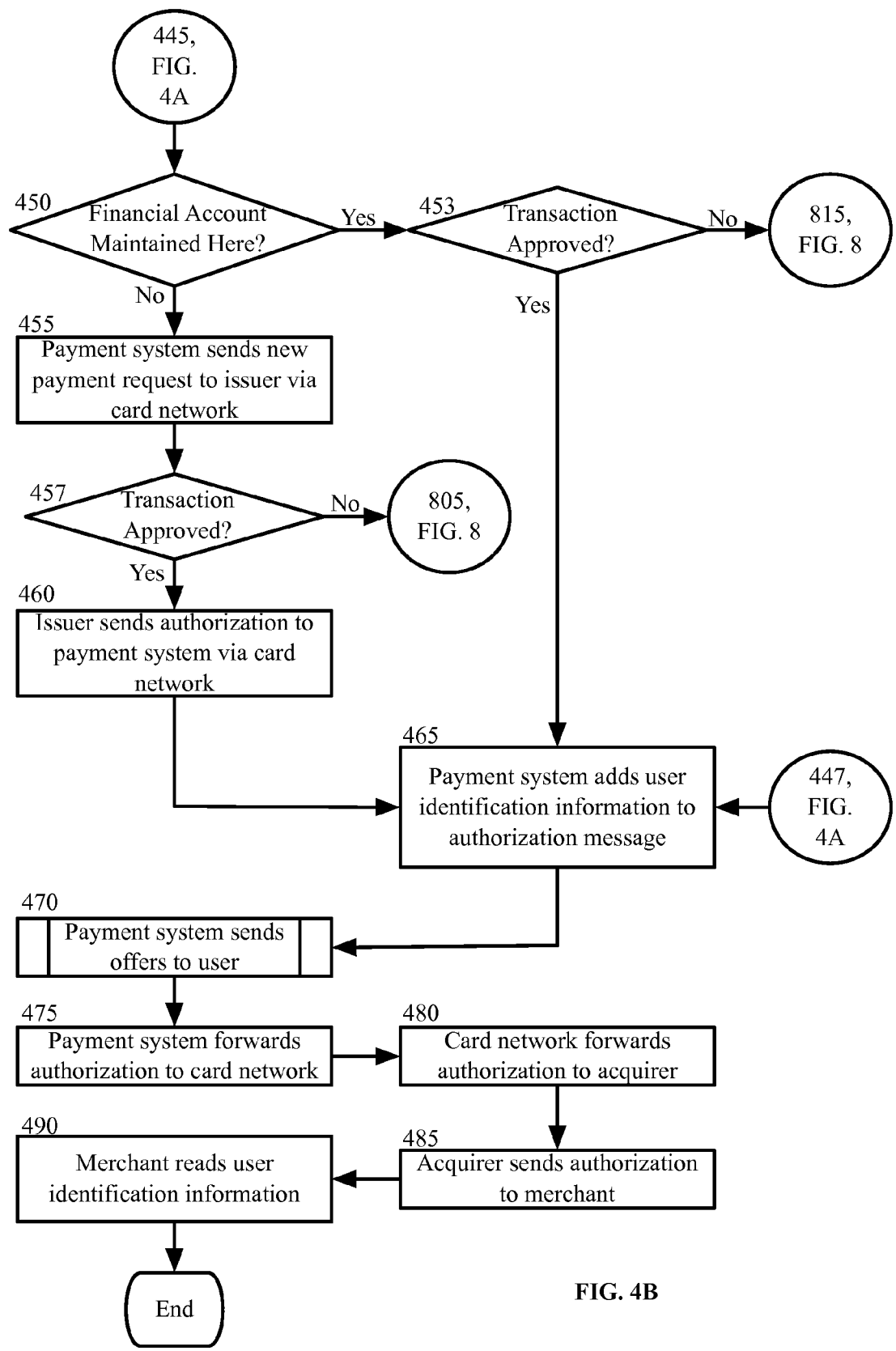

FIG. 4 is a block flow diagram depicting a method for processing a proxy card payment according to an exemplary embodiment. The method 400 is described with reference to the components illustrated in FIG. 1.

In block 403, the user 101 optionally modifies the static rules defined in block 240. In an exemplary embodiment, the mobile device 120 is used to temporarily add/modify/delete one or more static rules before a purchase is made using the proxy card 105. In an alternative exemplary embodiment, the terminal reader 113 and/or POS terminal 118 is used to temporarily add/modify/delete one or more static rules before a purchase is made using the proxy card 105.

The user 101 applies the proxy card 105 to a transaction with the merchant 110, in block 405. In an exemplary embodiment, the user 101 swipes the proxy card 105 at the POS terminal 118 to pay for a transaction with the merchant 110. Alternatively, the user may present a printed bar code, QR code, or other machine-readable indicia of the proxy card information for capture by the terminal reader 113.

In an alternative exemplary embodiment, the user 101 using the mobile device 120 to initiate a contactless "tap" with the terminal reader 113. In operation of an NFC transaction, a user 101 "taps" a mobile device 120, such as an NFC-enabled mobile phone 120, to a terminal reader 113 of a point of sale system. The terminal reader 113 recognizes the NFC-enabled device 120 when the device is moved within range of the reader 113, establishes a secure communication channel with the device 120, and initiates a payment transaction between the reader 113 and the device 120.

In alternative exemplary embodiment, the user 101 completes an online purchase via the Internet. The user 101 can browse the merchant's 110 website for products using a web server and indicate a desire to purchase one or more products. After the user 101 has indicated a desire to purchase the product(s) (for example, by actuating a "checkout" link), the merchant's 110 website can present a user interface in the form of a webpage to receive payment information from the user 101. The user 101 enters the proxy card 105 information to complete the purchase upon checkout.

In another alternative exemplary embodiment, the digital wallet application 122 can interact with a website of the merchant 110 and with the user 101. The merchant's 110 website can detect whether the mobile device 120 includes a digital wallet application 122 and attach to user's digital wallet. Once attached, the merchant's 110 website can send a purchase request message to the digital wallet application 122 requesting payment information. In response to receiving a purchase request message from the merchant's 110 website, the digital wallet application 122 can present the user 101 with a user interface 123 for the user 101 to confirm the purchase using proxy card 105 information saved in the digital wallet application 122.

In block 407, the POS terminal generates a payment request message to request payment using the proxy account, and the merchant system 110 optionally adds product identification information to the payment request message generated by application of the proxy card 105 to the transaction. In an exemplary embodiment, the product identification information comprises the SKU number(s) of the products sought in the user-merchant transaction. In alternative exemplary embodiments, the product identification information can comprise any suitable information that uniquely identifies a product. For example, the product identification information can include Global Trade Item Numbers ("GTINs"), such as International Standard Book Numbers ("ISBNs"), Universal Product Codes ("UPCs"), European Article Numbers ("EANs"), Japanese Article Numbers ("JANs"), brand name and model number combinations, and other standard identifiers. In an alternative exemplary embodiment, the product identification information includes a broad grouping of product/service identification (for example, the category of goods/services sought).

In an exemplary embodiment, the product identification information is inserted in an empty track of the magnetic stripe information obtained from the proxy card 105. Traditionally, at least one track on the magnetic stripe of a financial card remains unused. Since the payment system 160 functions as the issuer of the proxy card 105, the magnetic stripe can be formatted to contain variable information, in addition to the account information traditionally stored on tracks 1 and 2 of the magnetic stripe. The proxy card may be formatted to have one or more additional tracks wherein information can be transmitted between the merchant 110 and the payment system 160. In an exemplary embodiment, the merchant 110 adds product identification information to an empty track in the payment request message to enable the application of product-specific value added services to the current transaction, such as coupons, prepaid and other offers, and loyalty/rewards programs. In an alternative exemplary embodiment, the product level identification information can be used to provide the user 101 with product-specific coupons and offers to be used in a later transaction.

In block 410, the merchant 110 submits the payment request to the acquirer 140. In an exemplary embodiment, the merchant's POS terminal 118 submits the request to the acquirer 140 via a network (not illustrated). In an alternative exemplary embodiment, the merchant's 110 website submits a request to the acquirer 140.

The acquirer 140 submits the payment request to the card network 150, in block 415.

In block 420, the card network 150 determines whether the account number used to pay for the transaction is a classic card number. In an exemplary embodiment, the card network 150 automatically makes this determination using a series of numbers or routing information in the proxy card 105 account information. In an alternative exemplary embodiment, the card network 150 reviews a list of saved account identification information provided to the card network 150 by the payment system 160 above.

If the card number is a classic card number, the payment is processed according to traditional payment processing methods, in block 423.

If the card number is not a classic card number, the issuer 170 is the payment system 160 (for example, if the proxy card 105 was used for the transaction). The card network 150 then forwards the payment request to the payment system 160, in block 425.

In an alternative exemplary embodiment, the card number can comprise an identifier that corresponds to the list of saved account identification information, such as a block of numbers or other indicia, which identifies the issuer or the payment system. Based on this identifier, the payment is processed according to traditional payment processing methods, in block 423, if the identifier corresponds to a conventional issuer, or the payment is forwarded to the payment system 160, in block 425, if the identifier corresponds to the payment system 160.

In block 427, the payment system 160 optionally reads the product identification inserted into the payment request. In an exemplary embodiment, the product identification information was inserted by the merchant above. In an exemplary embodiment, the product identification information is used to determine which value added services can be applied to the current transaction. In an alternative exemplary embodiment, the product identification information is used to determine which offers can be provided to the user 101 for future transactions.

In block 430, the payment system 160 accesses the user's proxy card 105 account. The method for accessing a user's proxy card 105 account is described in more detail hereinafter with reference to the methods described in FIG. 5.

Figure 5:
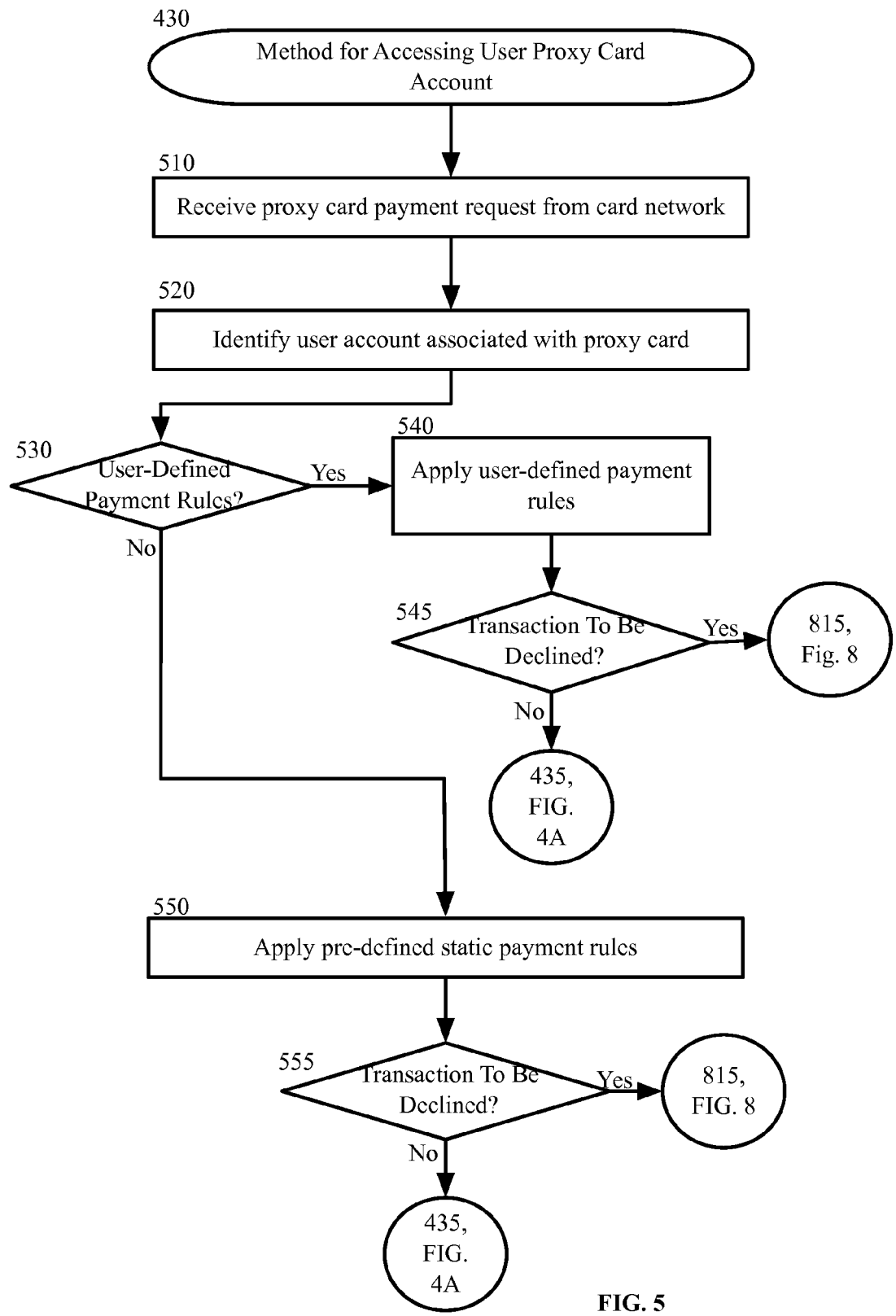
FIG. 5 is a block flow diagram depicting a method for accessing a user's proxy card account according to an exemplary embodiment.

FIG. 5 is a block flow diagram depicting a method for accessing a user's proxy card account according to an exemplary embodiment. The method 430 is described with reference to the components illustrated in FIG. 1.

In block 510, the payment system 160 receives the proxy card 105 payment request from the card network 150.

The payment system 160 identifies the user 101 account associated with the proxy card, in block 520. In an exemplary embodiment, the user's 101 account contains the static rules defined by the user 101 (or the default rules if the user 101 has not modified the default rules), any modifications made to the static rules prior to the transaction, and the associated financial accounts. In an exemplary embodiment, the payment system 160 uses the account information to determine how to proceed with the transaction.

In block 530, the payment system 160 determines if the user 101 has defined payment rules. In an exemplary embodiment, the user 101 has defined static rules and/or modified the rules prior to the transaction.

If the user has defined payment rules, the payment system 160 applies the user-defined rules first to determine the order to apply the financial accounts to the transaction, in block 540. In an exemplary embodiment, the payment system 160 applies the rules modified by the user 101 prior to the transaction first and the user-defined static rules second. In an alternative exemplary embodiment, the user 101 did not modify the rules prior to the transaction. In this embodiment, the payment system 160 applies the user-defined static rules first.

Figure 8B:
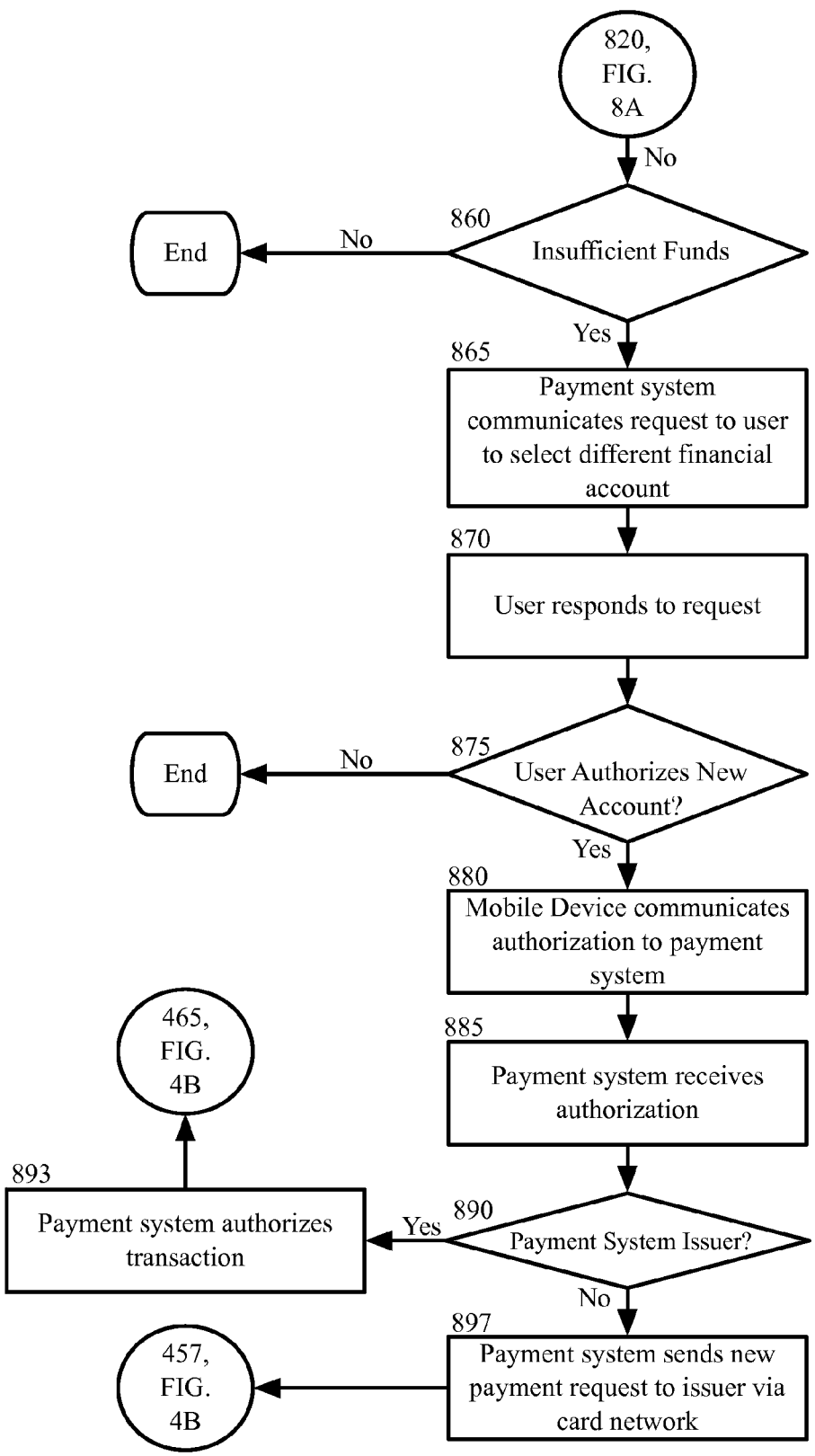

In block 545, the payment system 160 determines whether the transaction will be declined based on a user-defined rule. For example, if the user 101 defined a rule wherein no more than five transactions may occur in a single day, and this is the user's six transaction, the payment system 160 will determine that the transaction will be declined. If the transaction will be declined, the method 430 continues to block 815 (FIG. 8). Other rules that can cause a request to be declined include fraud protection rules. For example, the payment system 160 may decline a payment request if the transaction occurs outside of the user's 101 typical geographic area or if activity on the user's 101 account has exceeded a payment system 160 defined amount or number of transactions. Such fraud protection rules can be included in the default, static rules or the user-defined rules, or a combination thereof.

If the transaction will not be declined, the method 430 continues to block 434 (FIG. 4).

If the user has not defined payment rules, the payment system 160 proceeds to block 550. In block 550, the payment system 160 applies the default static payment rules to the transaction.

In block 555, the payment system 160 determines whether the transaction will be declined based on a default static rule. For example, if the user registered only gift cards with the payment system 160 and additional funds are required, the payment system 160 will determine that the transaction will be declined. If the transaction will be declined the method 430 continues to block 815 (FIG. 8).

If the transaction will not be declined, the method 430 continues to block 434 (FIG. 4).

From block 555, the method 430 proceeds to block 435 (FIG. 4).

Returning to FIG. 4, in block 435, the payment system 160 determines if the user 101 has any coupons, vouchers, prepaid offers, redemption offers, loyalty/rewards cards, or other forms of value added services associated with the proxy card 105.

If the payment system 160 determines that the user 101 has a value added service available, it will apply those financial accounts first, in block 437. In an exemplary embodiment, the payment system 160 will have a pre-defined order in which it looks for and applies the various forms of value added services. For example, the payment system 160 may apply vouchers first, then coupons, then redemption offers, and finally any other form of registered value added service. The method for processing value added services is described in more detail hereinafter with reference to the methods described in FIG. 6.

Figure 6:
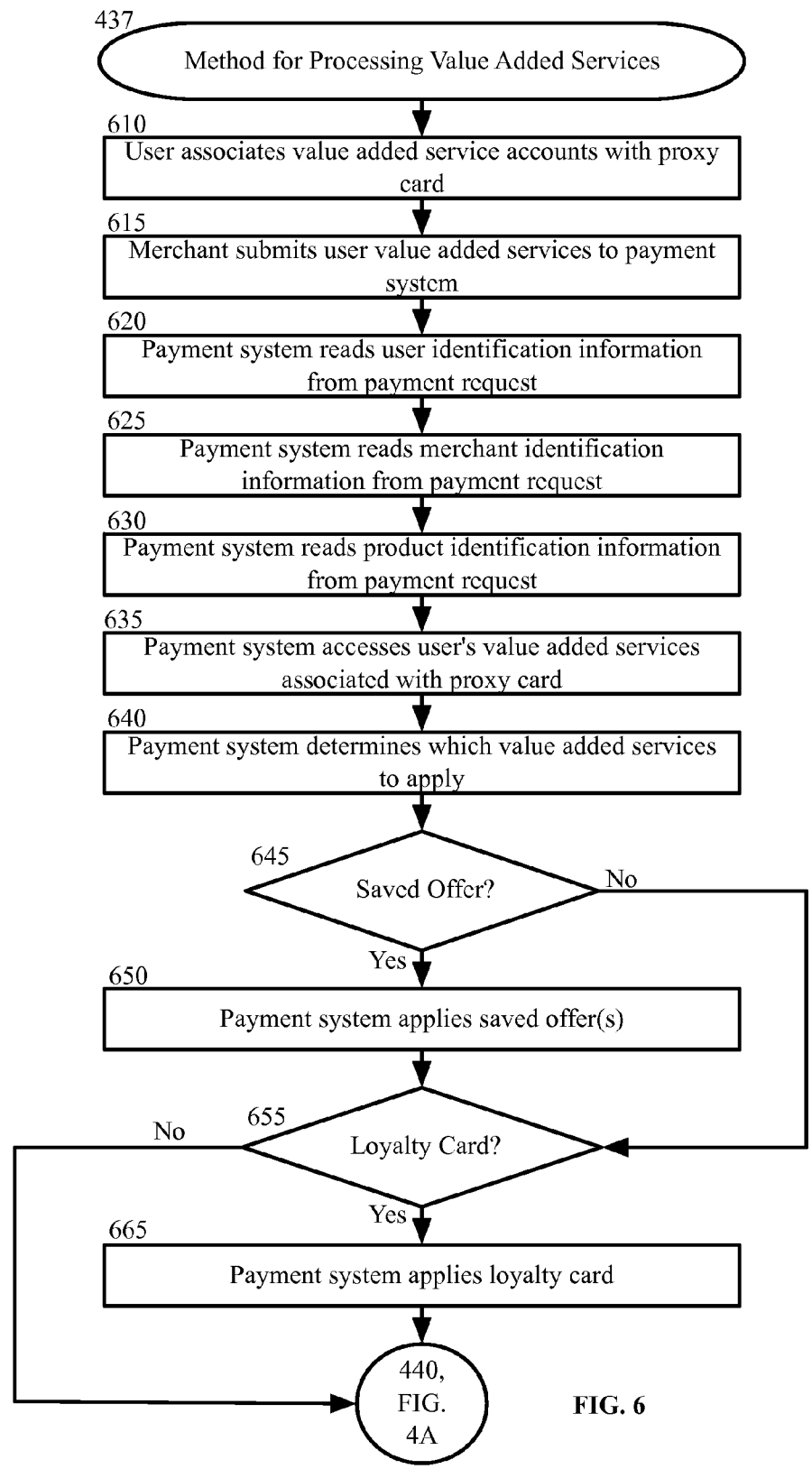
FIG. 6 is a block flow diagram depicting a method for processing value added services according to an exemplary embodiment.

FIG. 6 is a block flow diagram depicting a method for processing value added services according to an exemplary embodiment. The method 437 is described with reference to the components illustrated in FIG. 1.

In block 610, the user 101 associates value added service accounts with the proxy card 105. In an exemplary embodiment, this step is completed during the registration process described in FIG. 2. In an alternative exemplary embodiment, the user 101 adds value added service accounts, including coupons, loyalty cards, reward cards, offers (including prepaid offers), discounts, and other forms of value added services to the proxy card account at any time before the transaction.

The merchant 110 optionally submits value added service discounts to the payment system 160, in block 615. In an exemplary embodiment, the merchant Alternatively, or additionally, manufacturers can notify the payment system 160 of discounts, coupons, and other forms of value added services for particular products prior to the payment request. The payment system can search the data storage unit 167 for stored or received merchant and/or manufacturer value added services in connection with block 645, discussed hereinafter.

In block 620, the payment system 160 reads the user identification information form the payment request. In an exemplary embodiment, the user identification information is contained in or encoded by the proxy card 105 account identifier.

The payment system 160 reads the merchant 110 identification information from the payment request, in block 625. In an exemplary embodiment, the merchant 110 identification information is contained in or encoded by the payment request.

In block 630, the payment system 160 reads the product identification information from the payment request. In an exemplary embodiment, the product identification information is the SKU information inserted into the payment request by the merchant 110. In an alternative exemplary embodiment, the product identification information is a description of the type of goods/services sought.

The payment system 160 accesses the user's 101 value added services associated with the proxy card 105, in block 635.

In block 640, the payment system 160 determines which value added services to apply and/or the order to apply the value added services. In an exemplary embodiment, the order is defined by the user-defined static rules, the user-defined modified rules or the default static rules. In an alternative exemplary embodiment, the user 101 can define rules to be applied to specific value added services. For example, the user 101 can specify when to use a coupon or redeem an offer. These rule include, but are not limited to a purchase threshold (for example, receive $10 off a single purchase of more than $50 from merchant 110), an aggregate purchase threshold (for example, receive $10 off next purchase from merchant 110 after the accumulated purchase at merchant 110 has reached $1000), a minimum number of purchases from the merchant 110 (for example, receive $10 off your tenth purchase from the merchant 110), a time restriction (for example, receive $10 off a lunch-time purchase), and/or a location restriction (for example, receive $10 off a purchase at a specified merchant 110 location.

In block 645, the payment system 160 determines whether the user 101 has a saved offer for the transaction. In an exemplary embodiment, a saved offer can include, but is not limited to, a coupon, a voucher, a store reward, a redemption, or other form of saved offer.

If the user 101 has a saved offer for the transaction that meets the rules specified by the user 101 and rules specified for the offer, the payment system 160 applies the offer, in block 650. In an exemplary embodiment, the payment system 160 functions as the issuer 170 for the offer and can adjust the purchase price of the transaction after the offer(s) is applied.

In an exemplary embodiment, blocks 645 and 650 also comprise searching for value added services provided by the merchant or a manufacturer that can be applied to the purchase transaction based on the identity of the merchant or specific products in the purchase transaction.

If the user 101 does not have a saved offer for the transaction, the method 437, proceeds to block 655.

In block 655, the payment system 160 determines whether the user 101 has a loyalty card for the transaction.

If the user 101 has a loyalty card for the transaction, the payment system 160 applies the loyalty card, in block 665. In an exemplary embodiment, the payment system 160 functions as the issuer 170 for the loyalty card and can adjust the purchase price of the transaction after the loyalty card is applied. In an alternative exemplary embodiment, the loyalty card is applied before the offer(s) is applied.

If the user does not have a loyalty card for the transaction in block 655, the method 437 proceeds to block 440 (FIG. 4).

From block 655, the method 437 proceeds to block 440 (FIG. 4).

Returning to FIG. 4, in block 440, the payment system 160 will determine if the user 101 has a stored value account, including gift cards, prepaid cards, re-loadable transaction cards, exchange cards and other forms of non-credit based value cards associated with the proxy card 105.

If the payment system 160 determines in block 435 that the user 101 does not have a value added service available, the method 400 will proceed directly to block 440.

If the payment system 160 determines that the user 101 has a stored value card available, it will apply that financial account, in block 443. In an exemplary embodiment, the payment system 160 will determine if multiple stored value accounts are available and apply each financial account. In an exemplary embodiment, the payment system 160 functions as the issuer 170 for the stored value account and can adjust the purchase price of the transaction after the stored value account is applied. In an alternative exemplary embodiment, the payment system 160 will forward a new payment request to the issuer 170 that maintains the stored value account and receive the authorization from the issuer if the transaction is approved.

In block 445, the payment system 160 will determine if additional funds are required for the transaction. In an exemplary embodiment, the payment system 160 will adjust the purchase price of the transaction after the value added services and stored value accounts are applied to determine if additional funds are required. In an alternative exemplary embodiment, the payment system 160 will determine if additional funds are required after applying only the value added services or stored value account, as defined by the rules. In another alternative exemplary embodiment, value added services and stored value accounts are not applied to the transaction and the payment system 160 will automatically proceed to block 445.

If the payment system 160 determines in block 440 that the user 101 does not have a stored value card available, the method 400 will proceed to block 445.

If additional funds are not required in block 445 for the transaction, the payment system 160 will authorize the transaction, in block 447. The method 400 will then proceed to block 460.

If additional funds are required in block 445 for the transaction, the payment system 160 will determine in block 450 the issuer 160, 170 of the account(s) to be used to finance the remainder of the transaction. In an exemplary embodiment, the payment system 160 will determine if the user 101 has a debit card, credit card or other form of credit-based account associated with the proxy card 105, in block 450. The payment system 160 will apply the rules to select one or more credit/debit card to the transaction. In an exemplary embodiment, the payment system 160 will determine a single account to be used for the remainder of the transaction. In an alternative exemplary embodiment, the payment system 160 will determine that multiple accounts will be used for the remainder of the transaction.

If the payment system 160 is the issuer of the account, in block 453, the payment system 160 will approve or deny the account transaction. In an exemplary embodiment, the payment system 160 will determine whether sufficient funds are available and/or whether the transaction meets the rules for the financial account(s) used to complete the transaction.

If the transaction is declined, the method 400 proceeds to block 815 (FIG. 8).

If the transaction is approved, the method 400 proceeds to block 465 (FIG. 4).

If the payment system 160 is not the issuer 170 of the financial account(s), the payment system sends a new payment request to each issuer (170a, 170b, etc.) via the card network 150, in block 455. In an exemplary embodiment, the new payment request is for the remaining transaction balance after applying the value added services, stored value account, and/or any other financial account maintained by a different issuer 170.

In block 457, the issuer 170 approves or declines the transaction.

If the transaction is declined, the method 400 proceeds to block 805 (FIG. 8).

FIG. 8 is a block flow diagram depicting a method for authorizing a declined transaction according to an exemplary embodiment. The method 800 is described with reference to the components illustrated in FIG. 1.

If the payment system 160 is not the issuer that maintains the financial account (see block 457 (FIG. 4)), the issuer 170 notifies the payment system 160 of the declined transaction via the card network 150, in block 805.

In block 810, the payment system 160 receives the notification of the declined transaction from the issuer 170 via the card network 150.

The payment system 160 determines the reason the transaction was declined, in block 815. If the payment system 160 is the issuer that maintains the financial account (see block 453 (FIG. 4) or blocks 545, 555 (FIG. 5)) and the transaction was declined, the payment system 160 determines the reason the transaction was declined.

In block 820, the payment system 160 determines whether the transaction was declined because the transaction did not meet one or more user-defined or other user-overrideable rules.

If the transaction meets the user-defined rules, the method 800 proceeds to block 860 (FIG. 8).

If the transaction does not meet the user-defined rules, the payment system 160 communicates a real-time override request to the user 101, in block 825. In an exemplary embodiment, the override request is communicated to the user's mobile device 120. In an exemplary embodiment, the user 101 is prompted to override the user-defined rule using the user interface 123 of the mobile device 120.

In block 830, the user 101 responds to the override request using the user interface 123 of the mobile device 120. In an exemplary embodiment, the mobile device 120 communicates the override request and initiates an interaction with the user 101 to present options available for selection. In an exemplary embodiment, the application 122 is engaged and processes the override request received from the payment system 160 to present the information via the user interface 123. The application 122 may create a list of options available to the user 101 based on the information received from the payment system 160 and the information stored in the application 122. In another exemplary embodiment, the application 122 creates a series of prompts requesting user 101 choices for the available options. In an exemplary embodiment, a user response is optional.

If the user 101 does not authorize an override of the rules, in block 835, the transaction is declined and ends.

If the user 101 authorizes the override, the mobile device 120 communicates the override authorization to the payment system 160, in block 840.

In block 845, the payment system 160 receives the override authorization from the mobile device 120.

The payment system 160 determines the issuer 170 of the financial account, in block 850.

If the payment system 160 is the issuer of the financial account, the payment system 160 authorizes the transaction, in block 853. The method 800 then proceeds to block 465 (FIG. 4).

If the payment system 160 is not the issuer of the financial account, the payment system 160 sends a new payment request to the issuer(s) 170 via the card network 150, in block 855. The method 800 then proceeds to block 457 (FIG. 4).

If the transaction is declined, but meets the user-defined rules (see block 820 (FIG. 8)), the methods 800 proceeds to block 860 (FIG. 8).

In block 860, the payment system 160 determines whether the transaction was declined for insufficient funds.

If the transaction was not declined for insufficient funds, the transaction terminates.

If the transaction was terminated for insufficient funds, the payment system 160 communicates a request to the user 101 to override the rules and select a different financial account, in block 865. In an exemplary embodiment, the request is communicated to the user's mobile device 120. In an exemplary embodiment, the user 101 is prompted to select a new account using the user interface 123 of the mobile device 120.

In block 870, the user 101 responds to the request using the user interface 123 of the mobile device 120. In an exemplary embodiment, the mobile device 120 communicates the request and initiates an interaction with the user 101 to present options available for selection. In an exemplary embodiment, the application 122 is engaged and processes the request received from the payment system 160 to present the information via the user interface 123. The application 122 may create a list of options available to the user 101 based on the information received from the payment system 160 and the information stored in the application 122. In another exemplary embodiment, the application 122 creates a series of prompts requesting user 101 choices for the available options. In an exemplary embodiment, a user response is optional.

If the user 101 does not select a different financial account, in block 875, the transaction is declined and ends.

If the user 101 selects a different financial account, the mobile device 120 communicates the selection to the payment system 160, in block 880.

In block 885, the payment system 160 receives the selection from the mobile device 120.

The payment system 160 determines the issuer 170 of the financial account, in block 890.

If the payment system 160 is the issuer of the financial account, the payment system 160 authorizes the transaction, in block 893. The method 800 then proceeds to block 465 (FIG. 4).

If the payment system 160 is not the issuer of the financial account, the payment system 160 sends a new payment request to the issuer(s) 170 via the card network 150, in block 897. The method 800 then proceeds to block 457 (FIG. 4).

In exemplary embodiments, the real-time authorization provided by the method 800 can be performed in conjunction with, or instead of, declining the payment request. For example, if the payment system 160 determines to decline a payment request or receives a payment request denial from an issuer 170, the payment system 160 communicate a notice of declination to the merchant system 110. After the user submits an authorization to override a rule, a confirmation that the user is making the purchase even though fraud protection rules identified the transaction as possible fraud, or a selection of a different financial account, the user may immediately reinitiate the payment transaction with the merchant by using the proxy card again. This time, upon receipt of the payment request, the payment system 160 will approve the payment request (or process the payment request using the specified financial account). Alternatively, the payment system 160 can communicate the notice message to the user 101, wait for a response, and authorize or further process the payment request after receiving the user's 101 response without issuing a notice of declination to the merchant system 110.

Referring back to FIG. 4, if the transaction is approved, the issuer 170 sends an authorization message to the payment system 160 via the card network 150, in block 460. If the payment system 160 is the issuer of the financial account (see block 447), the payment system 160 notes the authorization of the transaction.

In block 465, the payment system 160 generated an authorization message and optionally adds user identification information to the authorization message. In an exemplary embodiment, the user 101 identification information may include an e-mail address, physical address, phone number, name, store loyalty number, or other form of identifying information. In an exemplary embodiment, the user's 101 identifying information may be used by the merchant 110 to send offers, coupons, vouchers, advertisements, or other forms redemption offers to the user 101.

In block 470, the payment system 160 sends offers to the user 101 to be used on a future transaction. The method sending offers is described in more detail hereinafter with reference to the methods described in FIG. 7.

Figure 7:
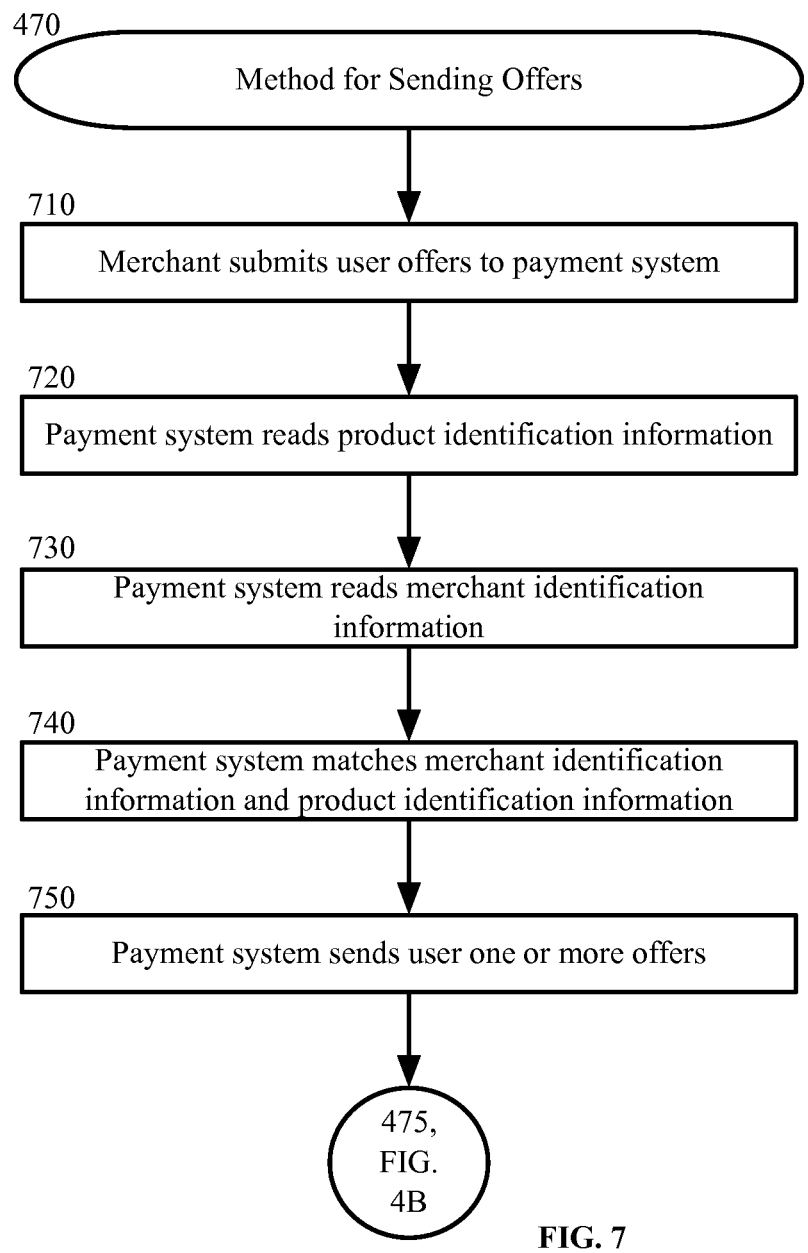
FIG. 7 is a block flow diagram depicting a method for sending offers according to an exemplary embodiment.

FIG. 7 is a block flow diagram depicting a method for sending offers according to an exemplary embodiment. The method 470 is described with reference to the components illustrated in FIG. 1.

In block 710, the merchant 110 submits offers to the payment system 160. In an exemplary embodiment the merchant 110 submits offers designed to promote return customers. For example, the merchant 110 may submit an offer for a percentage off the user's 101 next transaction. In an alternative exemplary embodiment, the merchant 110 submits offers based on the products/services purchased in the transaction. For example, the merchant 110 may submit an offer for a reduced price on the same or related product to be redeemed on the next visit. In an exemplary embodiment, the offers are submitted in advance of the transaction and stored by the payment system 160 in the data storage unit 167.

The payment system 160 reads the product identification information inserted by the merchant 110 in the payment request, in block 720. In an exemplary embodiment, the product identification information is the product/service SKU number.

In block 730, the payment system 160 reads the merchant 110 identification information from the payment request.

In block 740, the payment system 160 matches the merchant 110 identification information and the product identification information to determine whether one or more offer can be sent to the user 101. In an exemplary embodiment, the offers were submitted by the merchant in block 710. In an alternative exemplary embodiment, the offers are generalized offers based on the product identification information (for example, manufacturer's coupons).

The payment system 160 sends the user 101 one or more offers, in block 750. In an exemplary embodiment, the offers are saved in the user's 101 payment system 160 account and are associated with the proxy card 150. In an exemplary embodiment, the notification of the offers is communicated to the user via the mobile device, e-mail, SMS, text message, or other form of communication methods designated by the user 101. In an alternative exemplary embodiment, the offers are sent via a communication method designated by the user 101.

From block 750, the method 470 proceeds to block 475 (FIG. 4).

Returning to FIG. 4, in block 475, the payment system 160 forwards a transaction authorization message to the card network 150.

In block 480, the card network 150 forwards the authorization message to the acquired 140.

The acquirer 140 send the authorization message to the merchant 110, in block 485.

In block 490, the merchant system 110 optionally reads the user 101 identification information inserted in the payment authorization message by the payment system 160. In an exemplary embodiment, the merchant POS terminal 118 is able to extract the user 101 information from the authorization message and store the information for later use. For example, the merchant may use the identification information to contact the user 101 for survey information, to forward loyalty card information, or to forward other offers to the user 101. In an alternative exemplary embodiment, the user identification information can be provided in the proxy card account information stored on the magnetic stripe of the proxy card or otherwise associated with the proxy card account identifier. In this case, the terminal reader 113 reads the user information when collecting the initial information from the proxy card 105.

After use of each financial account for a particular payment request, the payment system 160 updates the used financial account for the user's 101 proxy card 105 in the data storage unit 167. For example, if a single-use coupon, prepaid or other offer, or loyalty card is applied, the account is updated to note use of the item and that further use is not allowed. If a stored value card is used, the account is updated to note the amount used and any remaining amount that is available. If a debit or credit card is used, the account is updated to show the amount available and the remaining amount that is available. The payment system 160 also can increment or decrement loyalty cards or reward cards provided by the merchant, allowing the loyalty or other rewards to accumulate for future use.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks and components corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for providing real-time notifications of declined payment account transactions, comprising:
   receiving, using one or more computing devices of a payment system, a first payment request from a merchant computing device for a purchase by a user from a merchant associated with the merchant computing device, the first payment request comprising information identifying a payment account associated with the user and maintained by the payment system, the payment account comprising information for one or more financial accounts maintained by one or more non-payment system issuers;
   selecting, by the one or more computing devices, which of the one or more financial accounts associated with the proxy account to use to process the first payment request based at least in part on one or more payment rules defined for the payment account;
   declining, by the one or more computing devices, the first payment request based at least in part on a deficiency in the selected financial account;
   notifying, by the one or more computing devices, the user of the declined first payment request, the notification comprising one or more options such that user selection of a particular one of the options will immediately resolve the deficiency associated with the selected financial account;
   receiving, by the one or more computing devices, a selection of the one or more options from the user;
   updating, by the one or more computing devices, the one or more payment rules defined for the payment account based at least in part on the received selected option;
   receiving, using one or more computing devices of a payment system, a second payment request from the merchant computing device for the purchase by the user from the merchant associated with the merchant computing device, the second payment request comprising information identifying the payment account; and
   authorizing, by the one or more computing devices, the second payment request based at least in part on the updated payment rules defined for the payment account.

2. The computer-implemented method of claim 1, wherein the user is notified of the declined first payment request via a mobile communication device.

3. The computer-implemented method of claim 1, wherein the user selects the one or more options via a mobile communication device.

4. The computer-implemented method of claim 1, wherein the user is notified of the declined first payment request via a point of sale terminal.

5. The computer-implemented method of claim 1, wherein the user selects the one or more options via a point of sale terminal.

6. The computer-implemented method of claim 1, wherein the user is notified of the declined first payment request via a website.

7. The computer-implemented method of claim 1, wherein the user selects the one or more options via a website.

8. The computer-implemented method of claim 1, wherein the one or more options comprise a selection of an alternate financial account.

9. The computer-implemented method of claim 1, wherein the one or more options comprises a fraud detection question to determine that the first payment request is not fraudulent.

10. A computer program product, comprising:
    a non-transitory computer-readable medium having computer-readable program code embodied therein that when executed by a computer cause the computer to provide real-time notifications of declined payment account transactions, the computer-readable program code comprising:
    computer-readable program code to receive a first payment request from a merchant computing device for a purchase by a user from a merchant associated with the merchant computing device, the first payment request comprising information identifying a payment account associated with the user and maintained by the payment system, the payment account comprising information for one or more financial accounts maintained by one or more non-payment system issuers;
    computer-readable program code to select which of the one or more financial accounts associated with the payment account to use to process the first payment request based at least in part on one or more payment rules defined for the payment account;
    computer-readable program code to notify the user of a decision to decline the first payment request in response to determining that at least one of the one or more financial accounts has a deficiency associated therewith, the notification comprising one or more options such that user selection of a particular one of the options will immediately resolve the deficiency associated with the at least one of the one or more financial accounts;

computer-readable program code to receive a selection of the one or more options from the user;

computer-readable program code to update the one or more payment rules defined for the payment account based on the received selection of the one or more options;

computer readable program code to receive a second payment request from the merchant computing device for the purchase by the user from the merchant associated with the merchant computing device, the second payment request comprising information identifying the payment account.

11. The computer program product of claim 10, further comprising computer-readable program code to authorize the second payment request based on the updated payment rules defined for the payment account.

12. The computer program product of claim 10, wherein the user is notified of the declined first payment request via a mobile communication device.

13. The computer program product of claim 10, wherein the one or more options comprises selecting an alternate financial account.

14. The computer program product of claim 10, wherein the user is notified of the declined first payment request via a point of sale terminal.

15. The computer program product of claim 10, wherein the one or more options comprises a fraud detection question to determine that the first payment request is not fraudulent.

16. The computer program product of claim 10, wherein the user is notified of the declined first payment request via a website.

17. The computer program product of claim 10, wherein the user selects the one or more options via a website.

18. A payment system for providing real-time notifications of declined payment account transactions, comprising:
   a storage device; and
   a processor communicatively couple to the storage device, wherein the processor executes application code instructions that are stored in the storage device and that cause the system to:
      receive a first payment request from a merchant computing device for a purchase by a user from a merchant associated with the merchant computing device, the first payment request comprising information identifying a payment account associated with the user, the payment account maintained by the system, the payment account having associated therewith one or more financial accounts maintained by one or more non-payment system issuers;
      decline the first payment request based at least in part on a deficiency associated with at least one of the one or more financial accounts associated with the payment account;
      notify the user of the declined first payment request, the notification comprising one or more options such that user selection of a particular one of the options will resolve the deficiency associated with the at least one of the one or more financial accounts associated with the payment account;
      receive a selection of the one or more options from the user;
      update the one or more payment rules defined for the payment account based on the received selection of the one or more options; and
      receive a second payment request from the merchant computing device for the purchase by the user from the merchant associated with the merchant computing device, the second payment request comprising information identifying the payment account.

19. The system of claim 18, wherein the processor further executes application code instructions stored in the storage resource that cause the system to authorize the second payment request based on the updated payment rules defined for the payment account.

20. The system of claim 18, wherein the user is notified of the declined first payment request via a mobile communication device.

21. The system of claim 18, wherein the user is notified of the declined first payment request via a point of sale terminal.

22. The system of claim 18, wherein the user responds to the notification of the declined first payment request via a point of sale terminal.

23. The system of claim 18, wherein the user is notified of the declined first payment request via a website.

24. The system of claim 16, wherein the one or more options comprise an alternate financial account.

25. The system of claim 16, wherein the one or more options comprise a fraud detection question to determine that the first payment request is not fraudulent.

26. The system of claim 16, wherein the processor further executes application code instructions stored in the storage resource that cause the system to select which of the one or more financial accounts associated with the proxy account to use to process the first payment request based at least in part on one or more payment rules defined for the payment account.

* * * * *